Sept. 19, 1967  T. A. RUBLE  3,342,556
METHOD AND APPARATUS FOR MANUFACTURING CARBON BLACK
Filed Aug. 20, 1964  2 Sheets-Sheet 1
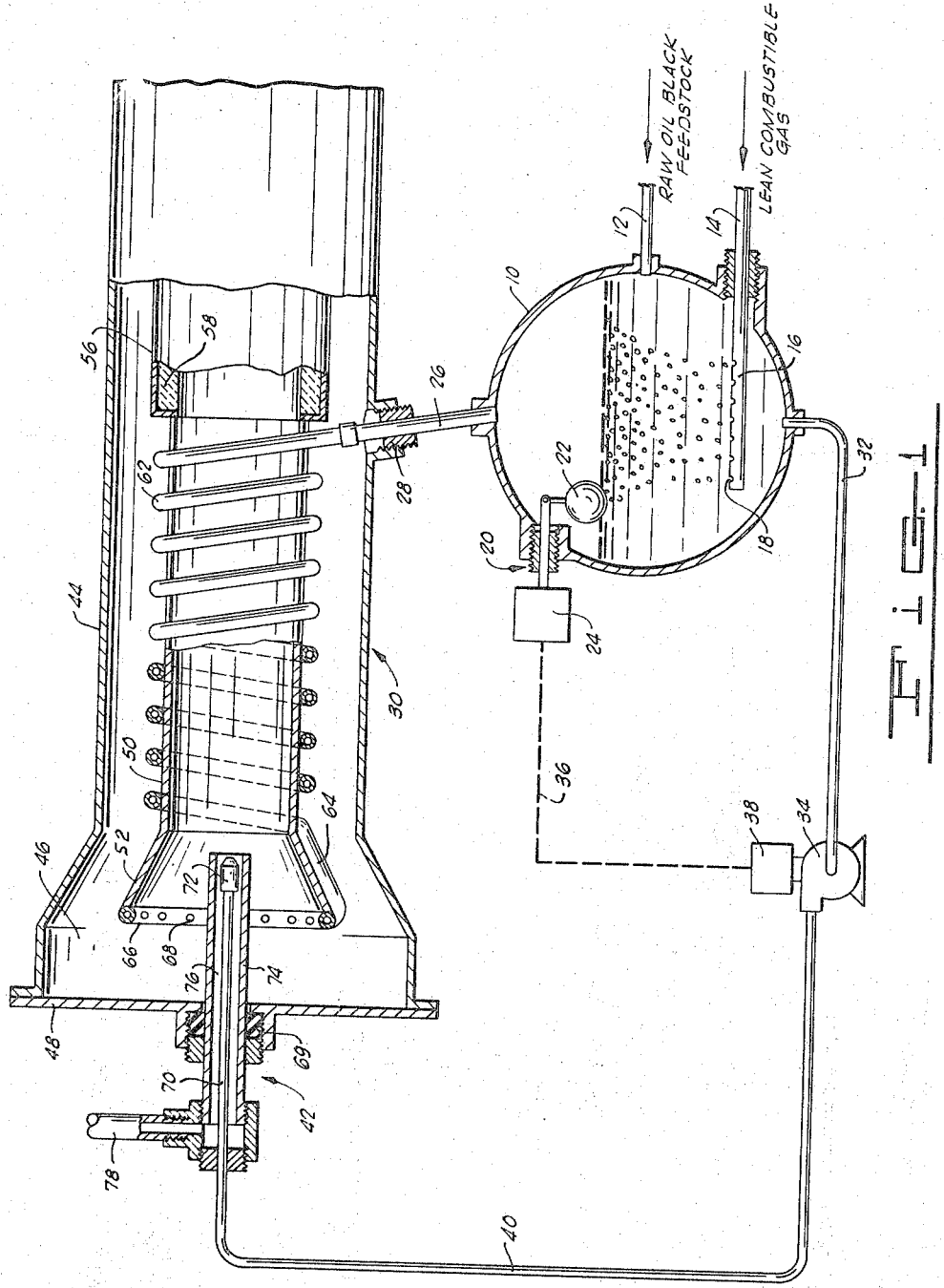
INVENTOR.
THEODORE A. RUBLE
BY
L. David Trapnell
ATTORNEY

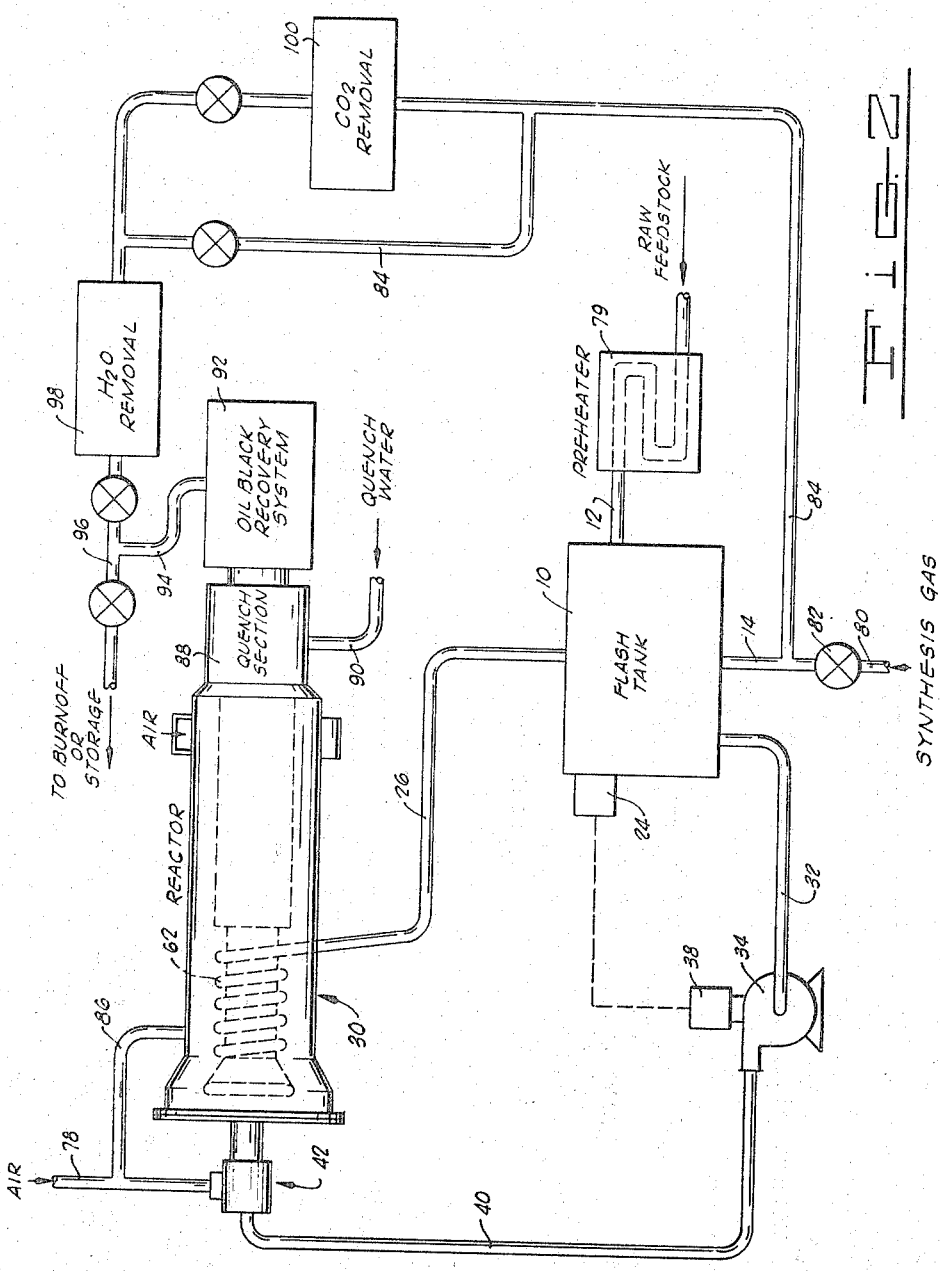

United States Patent Office 3,342,556
Patented Sept. 19, 1967

3,342,556
METHOD AND APPARATUS FOR MANUFACTURING CARBON BLACK
Theodore A. Ruble, Houston, Tex., assignor to Continental Carbon Company, Houston, Tex., a corporation of Delaware
Filed Aug. 20, 1964, Ser. No. 390,975
20 Claims. (Cl. 23—209.4)

This invention relates to manufacture of carbon black by the furnace process. More particularly, this invention relates to an improved method and apparatus for manufacturing oil black by the pyrolytic decomposition of relatively high molecular weight residual liquid hydrocarbons.

It is well-known in the art of making the type of carbon black which is termed oil black that in areas where a plentiful supply of low molecular weight, gaseous hydrocarbons are available for use as fuel in the oil black reactor, such gaseous hydrocarbons constitute the preferred materials for providing the heat for cracking the normally liquid oil black feedstocks because of their higher B.t.u. content. On the other hand, in other areas where natural gas is less plentiful, and is therefore relatively costly, the economic advantages derived from the use of such fuel as a heat source for cracking the oil black feedstocks are somewhat less attractive. It is therefore the practice in the production of oil black in these areas to burn light oils to provide the heat necessary to crack the heavier feedstock to oil black and hydrogen gas.

The present invention provides an improved method and apparatus for producing oil black which effectively increases the yield of oil black by the use of fuel having a low hydrogen content and by converting the feedstock to a heavier, higher-boiling material through the removal of the light components therefrom. The invention provides a method for economically supplying a fuel of high heat content at less cost than the cost of previously used gaseous, low molecular weight hydrocarbons, such as methane, ethane and natural gas, in areas where these materials are in relatively short supply and therefore are more expensive. In practicing the process of the invention, no sacrifice in the quality of the final product occurs as a result of the use of the novel combustion gas composition used in the process.

Broadly described, the present invention comprises continuously vapor stripping a heavy, highly aromatic residual or gas oil feedstock, and using the vapors derived from such stripping to supply a substantial portion of the heat required in a furnace type carbon black reactor to crack the stripped bottoms from said vapor stripping procedure. In more specific terms, the present invention comprises passing a combustion gas having a relatively low total B.t.u. content through a body of a highly aromatic, residual or distillate type oil black feedstock under conditions conducive to stripping a sufficient quantity of light ends from the feedstock to provide a mixture of the combustion gas and light ends having a sufficiently high heat content to provide the heat required to crack the stripped feedstock to carbon black and hydrogen. The final heat content of the combustible gaseous mixture is governed by the manner in which the feedstock is subjected to stripping, the nature of the combustion gas and the extent the mixture of combustion gas and light ends are preheated prior to actual combustion. Novel apparatus is provided for the accomplishment of the stripping and preheating. In the carbon black reactor, the combustible mixture is burned in close proximity to the oil black feedstock which has been subjected to the vapor stripping, and provides sufficient heat to pyrolytically decompose or crack the feedstock to the desired oil black product. The oil black can then be recovered by conventional procedures.

In one embodiment of the invention, the carbon monoxide and hydrogen gas produced in the oil black reaction are separated from the reactor effluent and are used as the stripping gas for stripping the low molecular weight hydrocarbons from the feedstock. This procedure possesses the advantage of utilizing to a maximum extent the total energy content of the feedstock so as to reduce the total quantity of extrinsic fuel gas which must be supplied to the process.

From the foregoing summary description of the invention, it will be perceived that an important object of the invention is to provide an improved method for producing oil black, which method can be more economically practiced than oil black processes which employ methane, ethane or natural gas as a combustible fuel.

An additional object of the invention is to provide an improved method for producing oil black, which method produces higher yields and better quality of oil black than oil black processes which burn light oils in order to provide the heat required in the process.

Another object of the present invention is to provide novel apparatus for producing oil black economically and in good yields without requiring the use of natural or manufactured gas as a combustible fuel.

Yet another object of the invention is to provide a method of producing oil black in which the combustible effluent gases from an oil black reactor are used to provide a portion of the heat energy required to crack a liquid feedstock to oil black.

A further object of the invention is to provide a method for economically supplementing a deficient supply of natural gas or manufactured gas with a less costly combustible material to provide a combustible mixture of sufficient quantity and heat content to efficiently fuel an oil black reactor.

In addition to the foregoing objects and advantages, additional beneficial features of the invention will be perceived as the following detailed description of the invention is read in light of the accompanying drawings which illustrate my invention.

In the drawings:
FIGURE 1 is a side elevation view, partly in section, illustrating one form of the novel apparatus with which the present invention can be practiced.

FIGURE 2 is a flow diagram illustrating the manner in which the apparatus illustrated in FIGURE 1 is incorporated in a complete oil black manufacturing system, and showing the way in which combustible gases present in reactor effluent are used in one embodiment of the invention to provide a portion of the heat required in the reaction.

In order to facilitate an understanding of the present invention, a description of one form of apparatus which can be utilized in practicing the process of the invention will be initially presented with only general reference being made to the materials which are passed through, and treated by, various portions of the apparatus. A more detailed description of the compositions subjected to physical and chemical treatment in the apparatus will be reserved for later discussion in the specification.

Referring initially to FIGURE 1 of the drawings, a flash tank 10 is provided with a raw feedstock feed pipe 12 and a combustion gas feed pipe 14. The combustion gas feed pipe 14 carries at its inner end a perforated discharge manifold 16 having the perforations 18 therein oriented to face upwardly in the flash tank 10. A float control assembly designated generally by reference character 20 is mounted in the upper portion of the flash tank 10 and includes a float 22 and a float responsive signal generating element 24.

An overhead discharge pipe 26 extends from the top of the flash tank 10 through a suitable packing gland 28 into a carbon black reactor designated generally by reference character 30 and hereinafter described in greater detail. A feedstock discharge conduit 32 extends into the bottom of the flash tank 10 and is connected between the flash tank and a metering pump 34. A suitable control linkage 36, which can be either a mechanical or electrical linkage, is connected between a governor 38 on the metering pump 34 and the float responsive signal generating element 24. A feed pipe 40 extends from the metering pump 34 through a feedstock injection element 42 into the influent receiving end of reactor 30.

One form of reactor 30 which can be utilized to manufacture oil black using the process of the present invention comprises an elongated, cylindrical, metallic outer tube or shell 44 which is flared outwardly at its upstream or influent receiving end to provide an enlarged chamber 46. The upstream end of the outer shell 44 is closed by a suitable closure plate 48. Disposed concentrically within the elongated metallic shell 44 is an inner metallic reactor tube 50 which is conterminous at one of its ends with the end of the smaller diameter portion of the elongated outer shell 44. A frusto-conical plate 52 is connected to this upstream end of the inner reactor tube 50 and extends into the chamber 46.

At its other end, the inner reactor tube 50 is connected to a tube 56 which is lined with a suitable refractory material 58, such as pre-cast silica carbide. The inside diameter of the inner metallic reactor tube 50 should be substantially the same as the inside diameter of the refractory material 58 in the metallic tube 56 so that no interference is afforded to the flow of reactants and combustion products through the reaction zone of the reactor 30. With the described arrangement, the inner metallic reactor tube 50 constitutes the first few feet of the reaction zone of the reactor 30 with the remaining portion of the reaction zone being constituted by the refractory material 58 and its circumscribing metallic tube 56 which extend for a substantial distance downstream from the inner metallic reactor tube 50 and are constructed in accordance with conventional and well-known practices in the carbon black technology. Instead of this downstream refractory lined portion of the reaction zone, a finned tube reactor may be employed, along with such associated structure as is now conventionally employed with finned tube reactors and well-understood in the art.

The end of the overhead discharge pipe 26 which terminates inside the carbon black reactor 30 is connected to one end of a preheat coil 62 which extends in helical convolutions around the inner metallic reactor tube 50, the basic purpose being to convey the combustion gas into chamber 46. Preferably, the preheat coil 62 is welded to the outer surface of the inner reactor tube 50. The preheat coil 62 is connected by a tube 64 to a perforated ring 66 having the perforations 68 therein oriented to direct combustion gas from the preheat coil 62 radially inwardly toward the center of the chamber 46. An alternate heat exchange arrangement is for coil 62 to be contacted by preheated air injected through the annulus between 44 and 50.

The feedstock injection element 42 extends through a suitable packing gland 69 into the upstream end of the carbon black reactor 30, and includes the feedstock injection pipe 70 having a spray head 72 secured to the end thereof, and an air pipe 74 concentrically surrounding, and defining an annulus 76 with, the feedstock injection pipe 70. An air feed pipe 78 is connected to the outer end of the air pipe 74 and communicates with the annulus 76 defined between the air pipe 74 and the feedstock injection pipe 70.

*Operation*

In utilizing the apparatus depicted in FIGURE 1 in the practice of the method of the present invention, a suitable liquid hydrocarbon, raw oil black feedstock is introduced in metered quantities to the flash tank 10 through the conduit 12. Before introduction to the flash tank 10, the raw oil black feedstock has been preheated to a temperature sufficient to permit a substantial quantity of the light ends or low molecular weight hydrocarbons in the feedstock to be easily stripped therefrom. It will thus be perceived that the temperature to which the raw feedstock is preheated will vary according to its boiling range and to certain other conditions obtaining in the flash tank 10 which will be hereinafter described in greater detail.

The raw feedstock material is introduced to the flash tank 10 in a quantity sufficient to raise the level of the liquid in the flash tank to the point at which the float 22 is located. A metered flow of a lean combustible gas is then introduced to the flash tank 10 from the conduit 14 and perforated manifold 16. The lean combustible gas is preferably preheated in order to enhance the efficiency of the vapor stripping procedure carried out in the flash tank 10 as hereinafter described. The combustible gas will generally be preheated to a temperature in the range of from 500° F. to 2000° F., depending upon its particular composition. Combustible gas emanating from the perforations 18 in the perforated manifold 16 bubbles upwardly through the raw liquid feedstock in the flash tank and effectively strips from the feedstock the low molecular weight components thereof to provide an overhead vapor which is comprised of the lean combustible gas introduced to the flash tank 10 from the conduit 14 enriched by a substantial quantity of light ends from the raw oil black feedstock. In different terms, the total combustible gas is augmented, and its heat content boosted by the addition of the stripped components from the raw liquid feedstock. The enriched overhead mixture thus contains sufficient heat content to promote the cracking reaction in the reactor 30 as hereinafter described.

The overhead vapors, which will hereinafter be termed fuel gas, from the flash tank 10 are passed through the overhead discharge pipe 26 into the preheat coil 62 of the carbon black reactor 30. The bottoms or heavy ends fraction of the raw liquid feedstock in the flash tank 10 is drawn through the discharge conduit 32 by the metering pump 34 at a rate which is correlated with the liquid level in the flash tank 10 so as to maintain a relatively constant raw feedstock level in the flash tank. From the metering pump 34, the vapor stripped feedstock is passed through the feedstock pipe 40, through the feedstock injection element 42 to the spray head 72 disposed within the carbon black reactor 30. Simultaneously with the injection of atomized vapor stripped feedstock into the reactor tube 50 from the spray head 72, air is introduced to the annulus 76 between the outer air pipe 74 and the feedstock injection pipe 70 from the air feed pipe 78 so as to provide a concentric flow of air around the spray head 72, thus directing the atomized feedstock axially down the center of the inner metallic reactor tube 50.

The fuel gas which is introduced to the preheat coil 62 from the overhead discharge pipe 26 flows through the helical convolutions of the preheat coil 62 and is further increased in temperature by heat exchange with the hot combustion gases flowing in a countercurrent direction through the inner metallic reactor tube 50. Finally, the preheated fuel gas is discharged through the perforations 68 in the perforated ring 66. Air which has been introduced into the annulus between the inner metallic reactor tube 50 and the outer shell 44 at a point (not shown) downstream in the reactor is mixed with the enriched fuel gas in the chamber 46. The mixture is ignited as it flows into the inner reactor tube 50 so as to form an annular sheath of flame and hot combustion products surrounding the atomized axially injected feedstock. In the combustion of the fuel gas, sufficient heat is released to provide a temperature in the reaction zone constituted by the inner metallic reactor tube 50 and the refractory lined tube 56 exceeding about 2000° F., and preferably exceeding about 2300° F. so that very little or none of the vapor stripped feedstock must be burned in order to crack the remaining portion of the feedstock to oil black and hydrogen. In this way, a higher yield of carbon black per gallon of feedstock is attained since very little or none of the feedstock need be consumed to provide heat to sustain the cracking reaction.

The effluent gases developed in the oil black reaction take the form of an oil black aerosol comprising substantial quantities of hydrogen gas, some carbon monoxide, a small amount of carbon dioxide, water vapor and suspended solid particles of oil black. The effluent is passed to suitable conventional recovery apparatus (not shown) for recovering the solid particles of oil black therefrom, and the combustible effluent gases may be purified, and charged through the conduit 12 to the flash tank 10 for use in the practice of the invention as hereinbefore described. A more detailed description of a complete oil black manufacturing arrangement in which hydrogen and carbon monoxide derived from the reactor effluent are used in the vapor stripping procedure will be hereinafter described.

The liquid hydrocarbon raw oil black feedstock which is charged to the flash tank 10 can be any conventional, highly aromatic residual or distillate type feedstock of the type now used in carbon black production, provided that the feedstock utilized in the process of the present invention contains sufficient light ends or low molecular weight hydrocarbons to yield a substantial quantity of vapors having a relatively high heat content upon being subjected to the vapor stripping action in the flash tank. These conventional feedstocks have previously been broadly described as being characterized in having a carbon-to-hydrogen ratio of about 0.75 to 1.25, a mean molecular weight of from about 140 to about 550, and an API gravity of not more than 20. Liquid feedstocks within this definition include refractory gas oils and heavy residual oils including thermal tars, and similar heavy, highly aromatic petroleum residues. Coal tar and shale oil are also sometimes used as feedstocks.

Since the light ends or low molecular weight hydrocarbons in the feedstock are to be removed therefrom by the vapor stripping procedure, the types of raw oil black feedstock liquid which can be charged to the flash tank 10 can also include liquid hydrocarbon mixtures which contain in addition to the components normally making up the conventional oil black feedstocks, a substantial portion of relatively low boiling hydrocarbons which will be removed from the liquid feedstock in the stripping process. Thus, the broad definition of the conventional oil black feedstocks hereinbefore set forth can be extended to include material having an API gravity as high as about 30 and having as much as 40 percent of the hydrocarbon mixture boiling below a temperature of about 550° F. This definition would then include recycle oils from hydrocarbon cracking processes and having a high aromatic content, degraded recycle gas oils, light cycle gas oils, heavy cycle gas oils, clarified oils obtained from a catalytic cracking operation, and other types of gas oils which, in general, contain a greater quantity of light ends or low molecular weight hydrocarbons than is characteristic of the heavy residual oils more frequently used in the oil black process. Since the various gas oils from thermal and catalytic cracking processes are valuable stocks for use in the production of other petroleum-derived products, however, it is economically preferable to use heavy, highly aromatic petroleum residues instead of these materials as the raw feedstock charged to the flash tank 10.

It is important that the raw feedstock selected for subjection to vapor stripping be highly aromatic, and the desired degree of aromaticity can best be defined by the Bureau of Mines correlation index of the material. The higher the numerical value of the correlation index, the greater is the aromaticity of the oil. In the practice of the present invention, the raw feedstock charged to the flash tank 10 suitably has a correlation index of from about 70 to about 135, and preferably from about 90 to about 130. It is further preferred that the raw feedstock has a Conradson carbon residue of from about 0.2 to about 10 percent and contains a substantial amount of relatively low molecular weight hydrocarbon components having a boiling point less than about 550° F. Although raw feedstocks containing as high as 40 weight percent light ends boiling below 550° F. can be used, it is preferable to use a feedstock having from about 5 weight percent to about 20 weight percent of its total composition boiling below 550° F.

A typical preferred raw feedstock which can be charged to the flash tank 10 is characterized by the following properties:

| | |
|---|---|
| Gravity ° API | 1.0 |
| Distillation, ° F.: | |
| I.B.P. | 441 |
| 5 | 541 |
| 10 | 578 |
| 30 | 631 |
| 50 | 657 |
| 70 | 683 |
| 90 | 731 |
| Conradson carbon residue percent | 0.3 |
| Correlation index | 127.5 |
| Asphaltenes percent | 0.1 |

The type and quantity of combustible gas which is charged through the conduit 14 to the flash tank 10 can vary widely. Substantially any gaseous material which can be burned in the carbon black reactor 30 to provide a portion of the heat required to crack the liquid feedstock can be charged to the flash tank 10. In order to achieve the objects of the invention, however, it is desirable to charge a gas having a relatively low heat content in order to realize the economic advantage accruing from the enrichment of the charged gas by the light ends stripped from the raw liquid feedstock within the flash tank 10. The gaseous material charged may thus comprise relatively inert or low B.t.u. waste gases containing a relatively small amount of natural gas or manufactured gas which, if used in pure form or greater concentrations, would in themselves provide sufficient heat upon combustion to crack the feedstock charged to the reactor to the desired products. On the other hand, the combustion gas charged to the flash tank 10 may contain a relatively large quantity of a combustible gas which in itself does not release sufficient heat upon combustion to crack the feedstock to oil black and hydrogen. In the latter category is included combustible carbon monoxide-hydrogen mixtures extracted from the carbon black reactor effluent, and, after the water vapor has been removed therefrom, charged to the flash tank 10.

In general, the considerations governing the selection and use of a particular combustible gas in the flash tank 10 are the cost of this material and the step-up in heat content which must be obtained by the vapor stripping procedure in order to provide a sufficiently enriched fuel gas to furnish the required heat to promote the oil black reaction. Thus, if there is charged to the flash tank 10, a raw feedstock which contains a relatively large amount of light ends, the combustible gas introduced to the flash tank via the perforated manifold 16 can have a lower inherent heat content, or can have a lower concentration of gases which in themselves have a relatively high heat content, particularly if the gas charged to the flash tank is highly preheated prior to its introduction to the flash tank. In the case of some raw oil black feedstocks containing a large amount of low molecular weight hydrocarbons, stripping gas will not be necessary, the vapor itself being relied upon to provide an adequate fuel gas for use in the reactor.

Having broadly described the apparatus, materials and procedural steps used in the practice of the present invention, a more specific embodiment of the present invention will next be discussed with reference being made to FIGURE 2 of the drawings. In the system illustrated in FIGURE 2, the flash tank 10 is supplied with raw feedstock from the feed pipe 12 after the feedstock has been preheated in a suitable preheater 79 to a temperature slightly lower than the boiling point of the light ends contained therein. A combustible gas is introduced to the flash tank 10 from the feed pipe 14. The combustible gas can be synthesis gas or some other suitable combustible gaseous material charged from a source outside the oil black system via a conduit 80 and valve 82 or, alternatively, can be combustible gases extracted from the effluent from the carbon black reactor and introduced to the feed pipe 14 from the conduit 84 in the manner hereinafter described.

The encirched fuel discharged as overhead from the flash tank 10 is passed through the overhead discharge pipe 26 into the preheat coil 62 located inside the carbon black reactor 30. The vapor stripped feedstock is discharged from the flash tank 10 through the feedstock discharge conduit 32 and is ultimately introduced to the reactor 30 through the feedstock injection element 42 in the manner hereinbefore described. Air is introduced to the reactor 30 from the air feed pipe 78 and can be supplemented, if desired, by hot air passed through the conduit 86 from the annulus between the elongated outer shell of the reactor 30 and the inner metallic reactor tube 50 (see FIGURE 1).

Inside the reactor 30, oil black is produced by the pyrolytic decomposition of the vaporized feedstock. The effluent from the reactor comprises an oil black aerosol containing suspended particles of oil black in a gaseous mixture of hydrogen, carbon dioxide, carbon monoxide and water vapor. Traces of methane and acetylene may also be present. The oil black reaction is terminated downstream of the reactor in quench section 88 by the injection thereinto of quench water delivered through quench pipe 90 to lower the temperature of the gases to about 1200° F. or below. The effluent from the quench section is then charged to a conventional carbon black recovery system 92 which may include cyclone separators, bag filters, electrostatic precipitators or other devices conventional in the art, and used for the purpose of recovering the solid particles of oil black from the effluent. The gaseous portion of the effluent is then discharged through a conduit 94 to a conduit 96 where the stream may optionally be diverted to a water vapor removal system 98, or may be passed to storage or burned.

When the water vapor has been removed from the effluent by water vapor removal system 98, the dried effluent gases may be further purified by removing the carbon dioxide therefrom in a suitable apparatus 100, or may, in some instances, be introduced directly to the feed pipe 14 via conduit 84. In either event, the gases charged to the feed pipe 14 contain substantial quantities of hydrogen and carbon monoxide, which materials can be burned to supply a portion of the heat used to promote the cracking reaction in the carbon black reactor 30. Since the purified effluent gases have already been heated by passage through the carbon black reactor 30, it will generally not be necessary to preheat these gases prior to their introduction to the flash tank 10.

In considering the oil black system illustrated in FIGURE 2, it will be perceived that an efficient procedure is proposed for utilizing the maximum energy content of the feedstock used in the process. The hydrogen and carbon monoxide gases produced in the reaction can be recycled through the flash tank 10 to strip from the raw feedstock any volatile light ends contained therein to thus provide an enriched fuel gas which will provide the necessary heat for promoting the oil black reaction. In avoiding the necessity to burn any substantial portion of the vapor stripped feedstock charged to the reactor, a relatively high yield of oil black per barrel of feedstock is realized, and the necessity for using large quantities of substantially pure natural gas, methane or ethane to provide the heat necessary to sustain and promote the reaction is obviated.

Although certain preferred embodiments of the present invention have been hereinbefore described in detail in order to provide an example of the practice of the invention, it will be appreciated that various changes and modifications can be made in both the apparatus described and depicted, and in the steps which have been specified in these examples without departing from the basic principles which underlie the invention. It is therefore intended that all such modifications and innovations which continue to rely upon the basic principles of the invention shall be circumscribed by the spirit and scope of the invention except as the same may be necessarily limited by the appended claims or reasonable equivalents thereof.

I claim:
1. In a furnace process for manufacture of carbon black wherein a carbon black producing hydrocarbon feedstock is continuously introduced into a turbulent burning mixture of fuel gas and air at one end of an elongated reaction zone to produce a reaction zone effluent of carbon black suspended in by-product combustion and dissociation gases from which the carbon black is subsequently removed; the improvement of continuously vapor stripping a liquid hydrocarbon mixture having a carbon-to-hydrogen ratio of from about 0.75 to about 1.25, an API gravity less than about 30, a mean molecular weight of from about 140 to about 550, and having less than about 40 weight percent of the hydrocarbon mixture boiling below 550° F.; then introducing the vaporous overhead from said vapor stripping step as fuel gas into said reaction zone while simultaneously charging to said reaction zone the stripped liquid hydrocarbon mixture as said feedstock.

2. The improvement in accordance with claim 1 in which said liquid hydrocarbon mixture is further characterized in having a correlation index of from about 70 to about 135 and a Conradson carbon residue of from about 0.2 weight percent to about 10 weight percent, and in containing from about 5 weight percent to about 20 weight percent hydrocarbons boiling below 550° F.

3. The improvement in accordance with claim 2 in which said liquid hydrocarbon mixture has a correlation index of from about 90 to about 130.

4. The improvement in accordance with claim 1 in which the vapor stripping medium is natural gas.

5. The improvement claimed in claim 1 in which said vapor stripping medium is synthesis gas.

6. The improvement claimed in claim 1 in which said vapor stripping medium is said by-product combustion and dissociation gases.

7. The improvement claimed in claim 1 and further characterized to include the step of passing said vaporous overhead in close proximity to said reaction zone prior to introducing the vaporous overhead to said reaction zone whereby said vaporous overhead is preheated by heat exchange with said turbulent burning mixture.

8. The method of producing oil black which comprises:
passing a gaseous material of relatively low heat content through a body of a liquid, highly aromatic oil black feedstock containing a substantial quantity of light ends boiling below 550° F. under conditions to strip at least a portion of said light ends from said oil black feedstock and provide a vaporous overhead having a substantially higher heat content than said gaseous stripping medium;

continuously burning said vaporous overhead in an elongated, cylindrical reaction zone to provide an annular sheath of flame and combustion gases having a temperature exceeding 2000° F.;

continuously introducing the stripped oil black feedstock axially into said cylindrical reaction zone to crack said stripped oil black feedstock to oil black and hydrogen gas; then recovering oil black from the effluent from said reaction zone.

9. The method in accordance with claim 8 and further characterized to include the steps of recovering combustible gases from the effluent from said reaction zone; and employing said combustible gases as the gaseous material used to strip a portion of the light ends from said oil black feedstock.

10. The method in accordance with claim 8 and further characterized to include the step of passing said vaporous overhead in close proximity to said reaction zone to preheat said vaporous overhead prior to burning it in said reaction zone.

11. The method in accordance with claim 8 and further characterized to include the step of preheating said oil black feedstock and gaseous material prior to passing said gaseous material through said oil black feedstock.

12. The method in accordance with claim 8 wherein said oil black feedstock contains less than 40 weight percent of hydrocarbons boiling below 550° F.

13. The method in accordance with claim 8 wherein said gaseous material comprises over 50 weight percent air, and less than 50 weight percent combustible gases.

14. The method in accordance with claim 9 wherein the recovery of combustible gases from said effluent is accomplished by the steps of removing water vapor from said effluent; and
removing carbon dioxide from said effluent.

15. The method in accordance with claim 12 wherein said oil black feedstock is further characterized in having a correlation index of from 70 to about 135, a Conradson carbon residue of from about 0.2 weight percent to about 10 weight percent, and in containing from about 5 weight percent to about 20 weight percent of hydrocarbons boiling below 550° F.

16. Apparatus for manufacturing carbon black comprising an elongated, metallic outer shell having an upstream end and a downstream end, and including a cover member closing said upstream end;

an elongated, metallic reactor tube of lesser diameter than said shell centrally positioned in said shell along the axis thereof, said reactor tube having substantially unrestricted upstream and downstream end openings, and said reactor tube having its upstream end opening disposed in longitudinally spaced relationship from the covered upstream end of said outer shell thereby providing a chamber in the upstream end of said outer shell having a length substantially less than that of said reactor tube;

an elongated, refractory-lined tubular reactor section axially aligned with said reactor tube within said shell and connected to the downstream end of said reactor tube;

feedstock injection means extending through said cover member in alignment with the axis of said metallic reactor tube and said refractory-lined reactor section and adapted to direct atomized liquid hydrocarbon feedstock into said reactor tube;

a flash tank;

means for introducing a liquid hydrocarbon feedstock to said flash tank;

means for introducing a stripping gas to said flash tank at a location in the lower part of the body of liquid hydrocarbon feedstock in said flash tank;

a preheat coil surrounding said elongated, metallic tube in heat exchange relation thereto and having a first end adjacent the down stream end of said reactor tube and a second end adjacent the upstream end thereof;

an overhead discharge pipe connecting the upper portion of said flash tank to said first end of said preheat coil for conveying gaseous overhead materials from said flash tank to said preheat coil;

gas distributing means positioned in said chamber between said cover member and the upstream end of said reactor tube, said gas distributing means being connected to said preheat coil for receiving preheated gaseous materials therefrom and adapted to distribute said gaseous materials radially inwardly toward the projected axis of said elongated, metallic reactor tube; and means for conveying stripped liquid hydrocarbon feed stock from said flash tank to said feedstock injection means.

17. An apparatus in accordance with claim 16 and further characterized to include means for maintaining a substantially constant predetermined level of liquid hydrocarbon feedstock in said flash tank during continuous introduction of said liquid feedstock to said flash tank and continuous conveyance of stripped feedstock from said flash tank to said feedstock injection means.

18. An apparatus in accordance with claim 15 wherein said gas distributing means comprises a perforated tubular ring extending concentrically around the projected axis of said metallic reactor tube and having the perforations therein oriented to direct gas radially inwardly with respect to said tubular ring.

19. An apparatus in accordance with claim 15 and further characterized to include separatory means connected to said refractory-lined tubular reactor section for receiving effluent from said tubular reactor section and for separating carbon black from the gaseous remainder of said effluent;

means for conveying at least a portion of the gaseous remainder of said effluent to said flash tank for use as the stripping gas therein.

20. An apparatus in accordance with claim 19 wherein said means for conveying at least a portion of the gaseous remainder of said effluent to said flash tank comprises means for removing water vapor from the gaseous remainder of said effluent;

means for removing carbon dioxide from the gaseous remainder of said effluent; and conduits connecting said water vapor and carbon dioxide removal means to said separatory means and to said flash tank.

References Cited

UNITED STATES PATENTS

| | | | |
|---|---|---|---|
| 2,641,534 | 6/1953 | Krejci | 23—209.4 |
| 3,211,532 | 10/1965 | Henderson | 23—259.5 |
| 3,256,065 | 6/1966 | Latham | 23—259.5 |

OSCAR R. VERTIZ, Primary Examiner.

E. J. MEROS, Assistant Examiner.